F. POST.
Land Roller.
No. 83,311.
Patented Oct. 20, 1868.
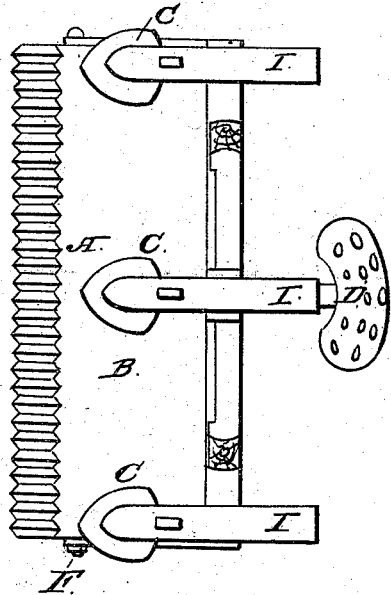
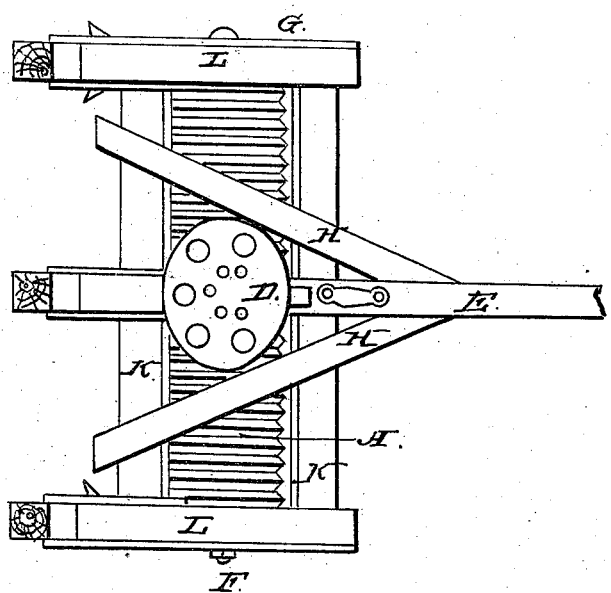
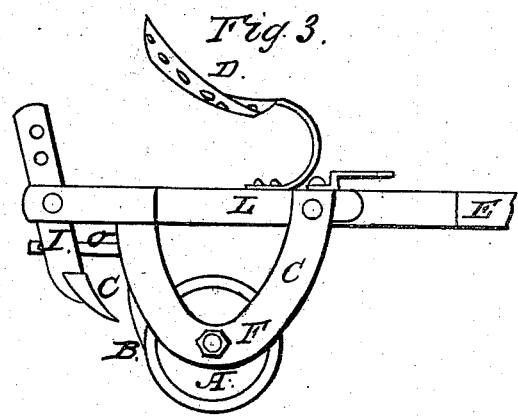
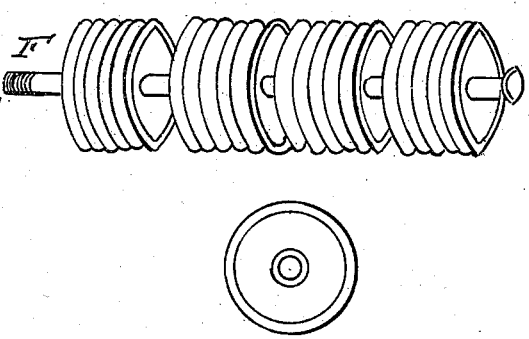
witnesses
A. Stewart
A. N. Beebe.
Inventor
Inventor's signature lost

FREDERICK POST, OF PLANO, ILLINOIS.

Letters Patent No. 83,311, dated October 20, 1868.

IMPROVEMENT IN PULVERIZING-LAND ROLLER.

The Schedule referred to in these Letters Patent and making part of the same.

*To all whom it may concern:*

Be it known that I, FREDERICK POST, of Plano, in the county of Kendall, and State of Illinois, have invented a new and improved Pulverizing-Land Roller; and I do hereby declare that the following is a full, clear, and exact description of the construction and operation of the same, reference being had to the annexed drawing, making a part of this specification, and the letters of reference marked thereon.

Figure 1 shows a rear,
Figure 2 a top, and
Figure 3 a side view.
Figure 4 shows the roller detached from frame.

Parts lettered as follows:

A, roller.
B, scraper.
C, markers.
D, seat.
E, tongue.
F, shaft.
G, bearing for shaft.
H, braces.
I, shovel-standards.
K, sills.
L, cross-bars.
O, connections.

I construct my roller as follows: I take two pieces of timber, say four inches square, and eight feet long, which I will call sills, and two of same size, say three feet long, which I will call cross-bars, and connect them together by bolts or otherwise, in the form of a frame, as shown in fig. 2, the sills being shown by K K, and the cross-bars by L L.

I now place across the centre of the frame another piece, of suitable size and length to form a tongue, as shown by E, fig. 2, to which to attach a team. This tongue I secure by bolts, and also by the braces H H, in fig. 2. I now attach, by means of bolts, to each of the cross-bars L L, a bearing for the roller-shaft, each bearing having a hole near its lower extremity, to receive the shaft.

These bearings are constructed of the shape shown in fig. 3, by the part marked G, and must extend far enough below the frame to allow the roller to revolve upon a shaft through the holes in the bearings, without coming in contact with the frame.

I now construct three markers, in the shape of the shovels used for ordinary shovel-plows, as shown by parts marked C, to which I attach standards, as shown at I in fig. 1.

These standards I attach to the rear ends of the cross-bars L L and the tongue E, by means of clamps and bolts.

For convenience, I allow the bearings G to extend back, as shown in figs. 2 and 3, past the rear end of the cross-bars L L, far enough to serve as the clamp upon the outside of the cross-bars.

The standards I are secured to these clamps by bolts passing through a hole near the end of each of the clamps, and also through the standards.

Through the standards I, however, are several holes, as shown in fig. 3, by means of which, and the bolts, the standards may be adjusted, and their depth regulated.

As an additional support to these standards, I make a connection, of any material having sufficient strength, and attach one end to the standard I, at a point between the shovel and its connection with the clamp, and the other end directly in front of the standard, by means of a staple, to the under side of one of the sills K. This connection is shown at O in fig. 3.

I now erect above the tongue E, and near the centre of the frame, a driver's seat, as shown at D.

I now construct a roller, say, in diameter, the size of an ordinary land-roller, and nearly the length of the sills K K, or just sufficient that, when placed in position underneath and parallel with the sills K K, its ends may pass without friction between the bearings G G. This roller I make in parts or sections, as shown in fig. 4, and around these sections I cut a series of channels or grooves, which grooves are, say, two inches in width at the top, or at the circumference of the roller, but diminish till they are of no perceptible width at the bottom, and these grooves being so close together that there shall be no perceptible space between them, that the circumference of the roller may present the appearance of a screw, with the thread having a sharp or cutting-edge, except that the edge is not continuous or spiral, but each one independent.

Now, these sections must not be so constructed that they may meet at the bottom of a groove, as in that case the soil would be forced into the groove, forcing the sections apart, and causing them to bind between the bearings G G, but so arranged that the cutting-edge shall be upon the extreme end of the section, that where the sections meet, the edges upon the end of two sections may, in effect, form one edge.

I now place these sections in juxtaposition, to form the roller A, and place the same beneath the frame, and its ends between the bearings G G, and secure it, by the shaft F, through the holes for the purpose, through the roller and the bearings G G.

I now construct the scraper B of heavy sheet-iron, or other suitable material, and attach it by any suitable means to the rear of the frame, as shown in fig. 1. This scraper must be as long as the roller, and wide enough to extend from the frame down as low as the centre of the roller A. Now, the lower edge of this scraper is made with teeth like those of a saw, which teeth must be the same size as the grooves in the roller, and this lower edge must be curved forward, as shown at B, fig. 3, until it shall come in close proximity to, and each one of these teeth enter, one of the grooves in the roller A, as shown in fig. 1.

The grooves in the roller A may be made deep or shallow, that the cutting-edges may be as blunt or sharp as required, and the teeth in the scraper be made to correspond.

The operation of my roller is as follows: If I am desirous only of rolling and pulverizing the land, I allow the markers to remain elevated, as now shown, and, attaching a team, pass the roller over the ground, as with an ordinary roller, but with the following different result: With an ordinary roller, having a smooth surface, when used on loamy ground in preparing it for corn, (which is cultivated in the West almost exclusively with the plow or cultivator,) many of the hard lumps are forced into the soft loam without being crushed, where they remain intact till the corn is being cultivated, to be again turned out and rolled upon the tender corn; but with this roller the cutting-edges are first pressed against the lumps, and enter them far enough to cause them to split or crack, after which, as the roller passes over them, they are finely crushed beneath its weight.

Furthermore, the grooves in this roller are made so deep in proportion to their width, that when forced full of soil by the weight of the roller pressing the cutting-edges their full depth into the ground, the soil will adhere to the roller, and be carried up till it meets the scraper A, and be by it scraped off, and allowed to fall to the ground, thus covering the surface of the ground with loose, finely-pulverized earth, and rendering it less liable to become, upon drying, covered with a crust, than when pressed down with the smooth surface of ordinary rollers. If I am desirous also of marking my ground for planting with the same operation, I lower the standards I, by means of the holes, as seen in fig. 3, until the shovels C come in contact with and enter the ground to a sufficient depth to answer the purpose. Now, in marking with an ordinary marker, if either of the outside markers meets with any extra resistance, as in passing over a hillock, the line of draught is changed from the centre of the marker, and thrown towards the point of resistance, causing the marker to be thrown out of a straight course, though the team be driven straight, often causing, unavoidably, many short crooks in the rows of corn. But by connecting the marker in the rear of a roller containing this series of cutting-edges, as the roller cannot be, except by great force, moved endwise, the marker is prevented from being thrown out of its course, and making the short crooks described above.

What I claim as my invention, and desire to secure by Letters Patent, is—

The roller A, in combination with the scraper B, markers C, sills K K, cross-bars L L, bearings G, and tongue E, all constructed and operating substantially as described.

FREDERICK POST.

Witnesses:
A. STEWARD,
FRED. W. GODARD.